United States Patent
Plöchinger (10) Patent No.: US 11,175,253 B1
(45) Date of Patent: Nov. 16, 2021

(54) SENSOR ARRANGEMENT WITH PROTECTION AND HEATING FUNCTION

(71) Applicant: Heinz Plöchinger, Freinberg (AT)

(72) Inventor: Heinz Plöchinger, Freinberg (AT)

( * ) Notice: Subject to any disclaimer, the term of this patent is extended or adjusted under 35 U.S.C. 154(b) by 0 days.

(21) Appl. No.: 17/305,079

(22) Filed: Jun. 30, 2021

(30) Foreign Application Priority Data

Apr. 28, 2021 (DE) .................. 10 2021 110 919.1

(51) Int. Cl.
*G01N 27/22* (2006.01)
*G01N 1/44* (2006.01)
*G01N 25/18* (2006.01)

(52) U.S. Cl.
CPC .............. *G01N 27/22* (2013.01); *G01N 1/44* (2013.01); *G01N 25/18* (2013.01)

(58) Field of Classification Search
CPC ........... G01N 1/44; G01N 25/18; G01N 27/22
See application file for complete search history.

(56) References Cited

U.S. PATENT DOCUMENTS 3,106,085 A * 10/1963 Cutler .................... G01N 25/18
374/44
5,376,794 A 12/1994 Gross et al.

2005/0279164 A1 12/2005 Ploechinger
2006/0037395 A1 2/2006 Ploechinger
2010/0186516 A1 7/2010 Hanselmann et al.
2014/0026640 A1 1/2014 Plöchinger
2016/0069764 A1 3/2016 Plöchinger
2018/0348077 A1 12/2018 Plöchinger
2019/0212219 A1 7/2019 Plöchinger et al.
2020/0103323 A1 4/2020 Plöchinger
2020/0256751 A1 8/2020 Bohl et al.

FOREIGN PATENT DOCUMENTS

DE         4244480 A1   7/1994
WO      2008154760 A1  12/2008
WO      2019063714 A2   4/2019

* cited by examiner

*Primary Examiner* — Daniel S Larkin
(74) *Attorney, Agent, or Firm* — Smartpat PLC (57) ABSTRACT

A housing assembly for receiving at least one sensor for measuring parameters of a fluid has an outer housing with a connection for connecting the housing arrangement to a container containing the fluid. An inner housing is arranged in the outer housing, is suitable for receiving the sensor and is connected to a tube. The tube is connected to the outer housing at the connection and is adapted to direct the fluid into the inner housing. The housing assembly also has a heating device in or on the inner housing which is suitable for heating the inner housing to a predetermined temperature and maintaining it at this temperature. The inner housing and the outer housing are spaced apart from each other except at the junction of the connection and supply pipe and the space formed thereby is evacuated.

11 Claims, 8 Drawing Sheets

SENSOR ARRANGEMENT WITH PROTECTION AND HEATING FUNCTION

CROSS-REFERENCE TO RELATED APPLICATION

This application claims the benefit of German Patent Application No. 10 2021 110 919.1, filed Apr. 28, 2021, the contents of which is hereby incorporated by reference in its entirety.

TECHNICAL FIELD

The invention relates to a housing assembly for accommodating sensors for measuring fluid parameters, such as pressure, composition or other properties of the corresponding fluids.

BACKGROUND

WO 2008/154760 A1 describes a vacuum measuring cell arrangement in which a heated measuring cell is enclosed by means of a highly insulating insulation jacket. This can significantly reduce the influence of fluctuating ambient temperatures. However, disadvantages of this arrangement are the high heating power required and the long preheating time. A high insulation effect is only achieved with a minimum thickness of the insulation jacket, which increases the external dimensions of the measuring cell arrangement.

WO 2019/063714 A2 describes a pressure sensor with a housing, a ceramic substrate, a sensor and a heating element. Since there is no effective insulation to the outside, no uniform temperature distribution is to be expected.

DE 4244480 A1 describes a sensor arrangement with a cooled sensor in a Dewar vessel. The arrangement has an inner and an outer housing part. The sensor itself is arranged in the vacuum space. Particle filters are not provided.

SUMMARY

The disclosure relates to a housing assembly for accommodating sensors for measuring fluid parameters, such as pressure, composition or other properties of the corresponding fluids. A space between an inner and an outer housing encloses an isolation vacuum. The inner housing ("sensor box") is heated at a suitable point and preferably regulated to a constant temperature. Thereby, the required heating power is considerably lower than with known arrangements.

A sensor protection element to protect sensitive sensors is also heated. The temperature gradient towards the measuring space provides additional protection against aggressive components in the fluid to be measured. A goal of the disclosure is to provide devices for the best possible reduction of environmental influences on the measurement results of sensors with which parameters of fluids are measured. Such measurements are commonly adversely affected by fluctuations in the ambient temperature and presence of particles in the fluid to be measured. Such particles act on or are deposited on sensor surfaces and thus falsify the measurement results.

The solutions described in this paper bring about a largely constant temperature at the sensors and uniform temperature distribution over the sensors. They work with the lowest possible operating power and within minimal space requirements. Protective arrangements intended to hold back particles and aggressive fluid components do not falsify the measurement result themselves or only to a very limited extent.

These advantages are achieved in that an outer housing with measuring connection and a heated inner housing ("sensor box") with sensor protection element are connected only by a single connection element ("support tube"). Heat dissipation is minimized by vacuum insulation of the space between the inner and outer housings.

A suitable heating device is integrated in or on the sensor box. Due to the length of the support tube, a high thermal resistance between the heated sensor box and the measuring connection, which is at ambient temperature, can be achieved.

Application-related variants will be described for sensor protection elements.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1A:
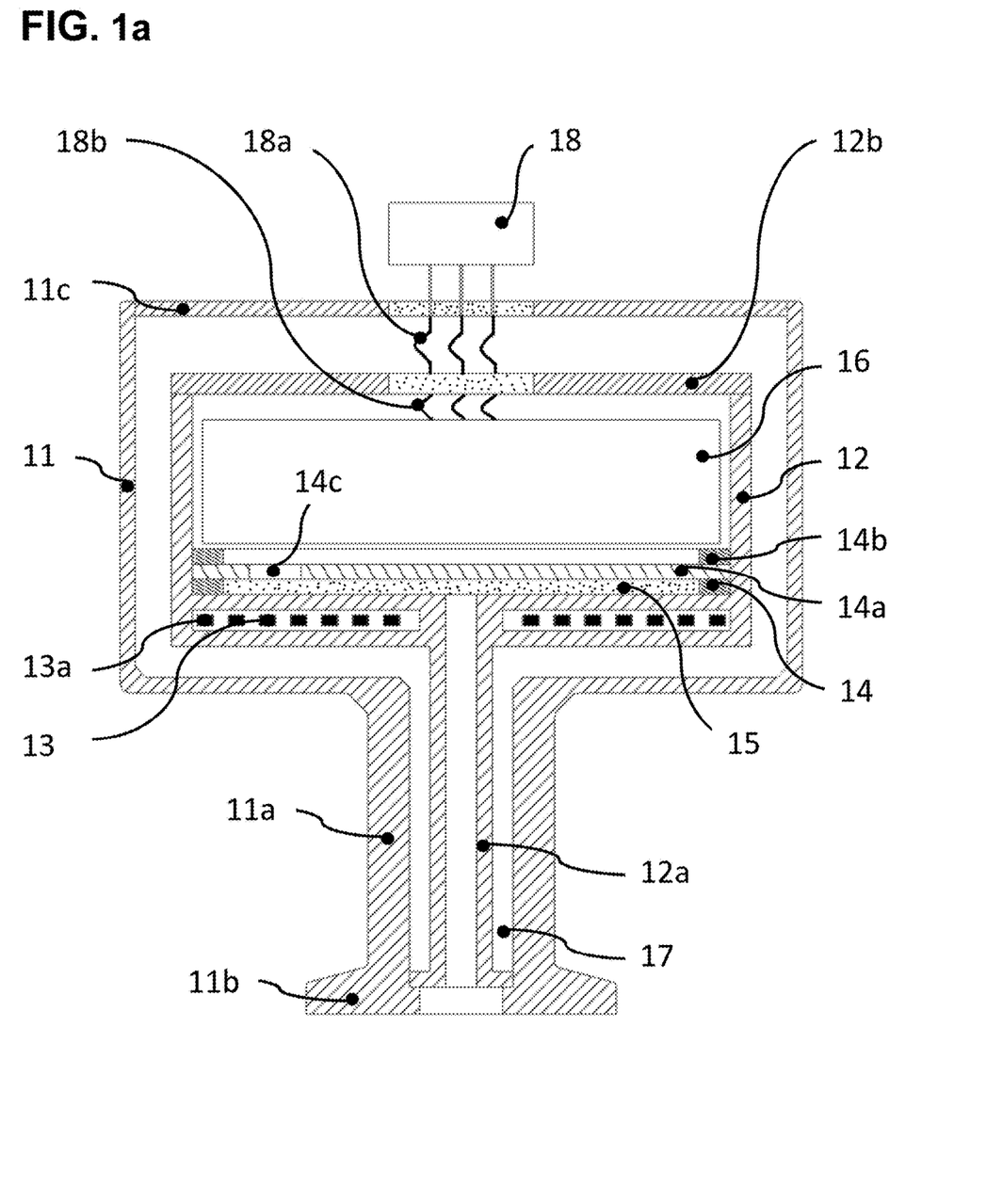
FIG. 1a is cross-sectional view of a housing assembly.

The invention is explained below with reference to FIGS. 1 to 5 in more detail. FIG. 1a shows the basic housing assembly with an outer housing 11 and an inner housing 12 ("sensor box").

The outer housing 11 includes a connection part 11a with the upper housing part (both here as a cylinder), the housing cover 11c and the measuring connection 11b (shown here as a flange, alternatively thread, etc.).

The outer housing 11 with the measuring connection 11b is connected to the inner housing 12, that is to say the sensor box with the cover 12b, only via the end of the support and supply tube 12a. The entire space from the connection point to the space between the covers 11c and 12b is evacuated with a sufficient insulation vacuum 17. The lower carrier plate of the sensor box 12 carries a heater 13.

The heater 13 can be attached inside the carrier plate, but also wholly or partially on its upper side, underside or, with good thermal conduction of the material of the sensor box, wholly or partly on its outer wall.

The heater 13 is preferably regulated exactly to a predetermined target temperature by means of the temperature sensor 13a.

A spacer ring 14 defines the space for a heated sensor protection element 15. The protection element 15 can consist in a simple form, for example, of a metal fiber fleece. The ring 14 is firmly connected to the protective element closing disk 14a with measuring openings 14c and the spacer ring 14b. The sensor 16 is arranged thereon in a sealed manner.

The measuring medium thus reaches the sensor 16 from the connection 11b via the support and supply tube 12a through the sensor protection element 15, which is also heated, by means of the measuring openings 14c.

Electrical connections of the sensor 18b are initially guided into the insulation vacuum 17 via an insulating bushing and from there, together with the power supply for heater 13 and the measuring connection for the temperature sensor 13a, to the connector plug 18 via another insulating bushing 18a.

Figure 1B:
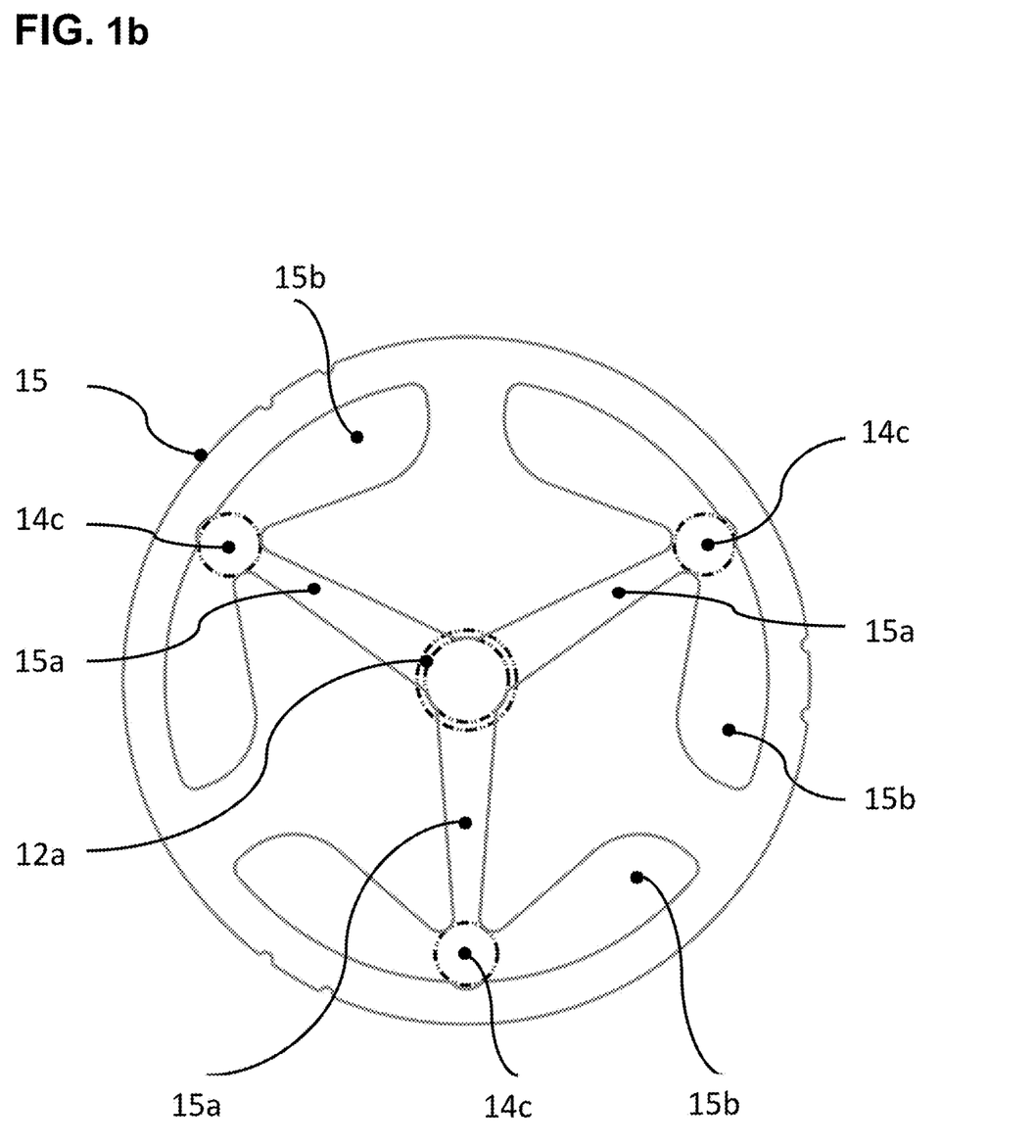
FIG. 1b is a top view of a sensor protection element.

FIG. 1b shows the top view of another embodiment of the sensor protection element 15 in the form of a metal plate with recesses for fluid flow channels 15a and particle reservoirs 15b, as well as for the connection areas shown in dashed lines to the support and supply tube 12a and the measuring openings 14c.

When a fluid flows into the empty sensor antechamber, entrained particles are accelerated through the narrowing flow channels 15a and held back in the reservoirs 15b.

Figure 2:
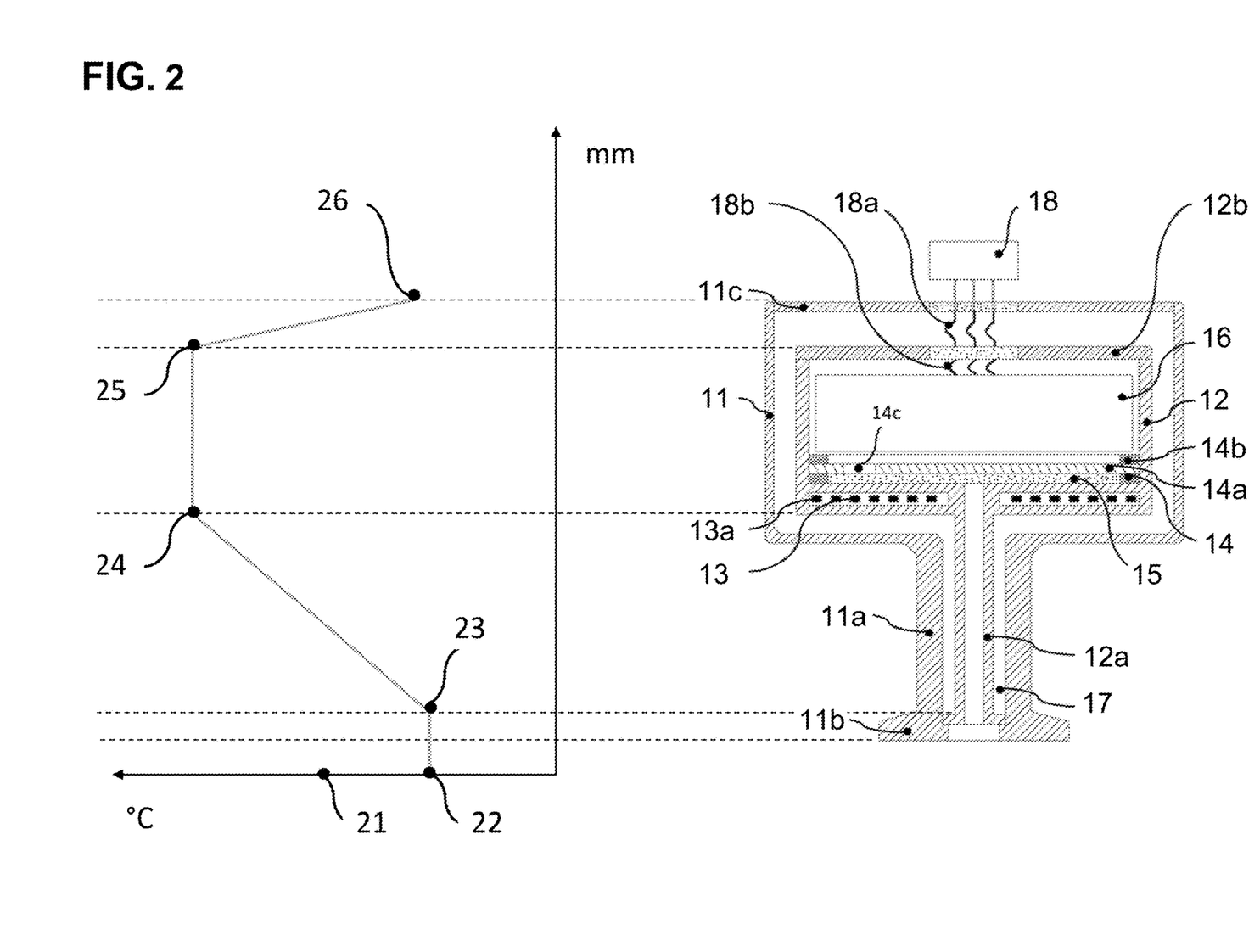
FIG. 2 shows the cross-section as in FIG. 1 in combination with a temperature diagram.

FIG. 2 shows the arrangement from FIG. 1a together with the temperature diagram 21 for the inner housing 12 ("sensor box").

The ambient temperature 22 of the measuring space will be assumed due to the good thermal conductivity of metallic connection fittings up to point 23, the transition point for the support and supply tube 12a.

From the transition point 23 to the carrier plate with the heater 13, the temperature rises to the level 24, the regulated target temperature. Since radiation losses are low, the target temperature is maintained within the sensor box 12 up to level 25 (cover 12b). The temperature falls to level 26 at the housing cover 11c.

Figure 3A:
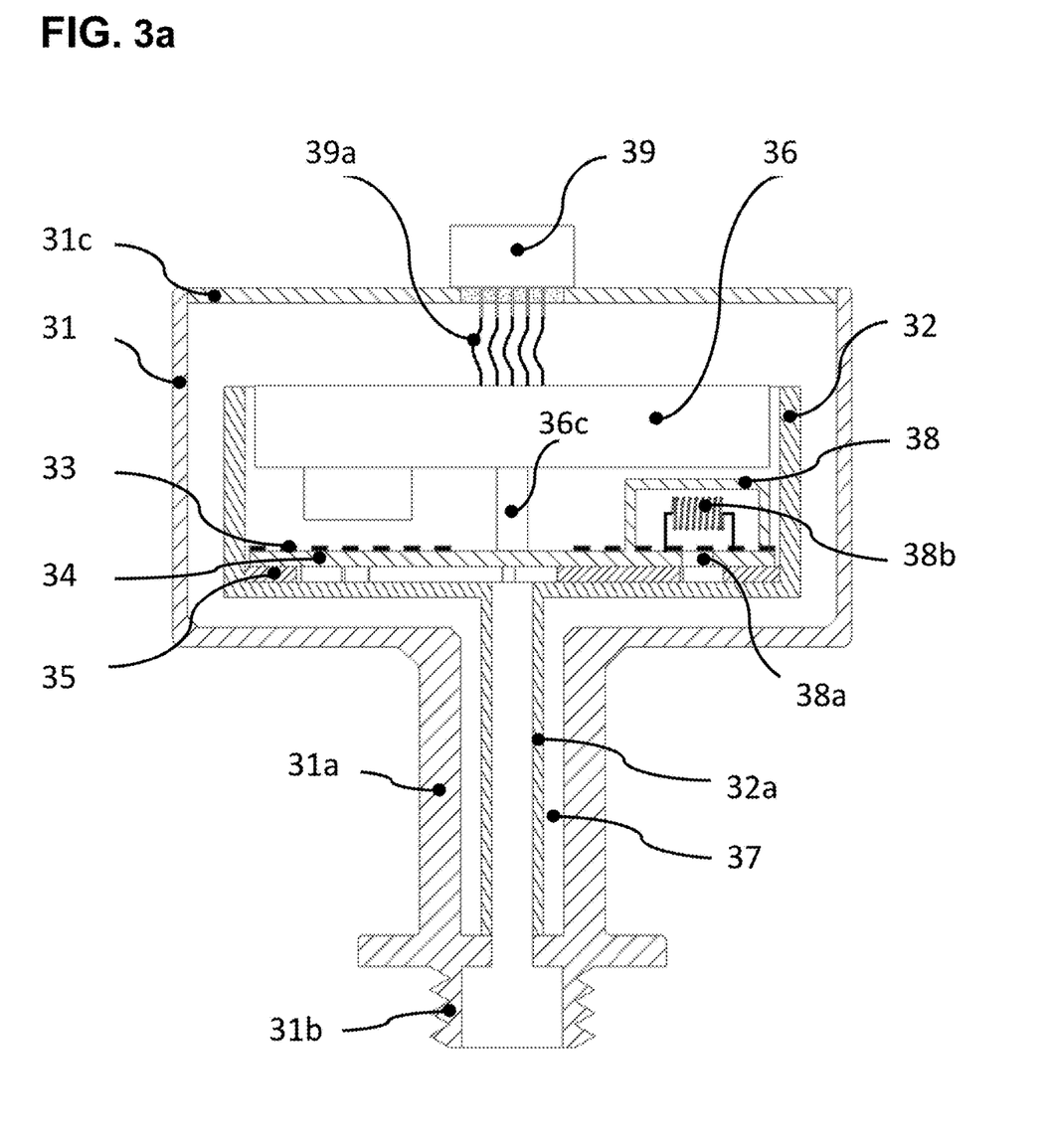
FIG. 3a is cross-sectional view of an alternative housing assembly.

FIG. 3a shows an arrangement with an outer housing 31 and an inner housing 32 ("sensor box"). The outer housing 31 includes the upper housing part and the connection part 31a, the housing cover 31c and the measuring connection 31b (e.g. thread). The space between the outer and inner housings is evacuated with the insulation vacuum 37.

In contrast to FIG. 1, this arrangement is intended to accommodate two sensors with different measurement principles, for example a capacitive sensor 36 and a Pirani sensor 38b.

Figure 3B:
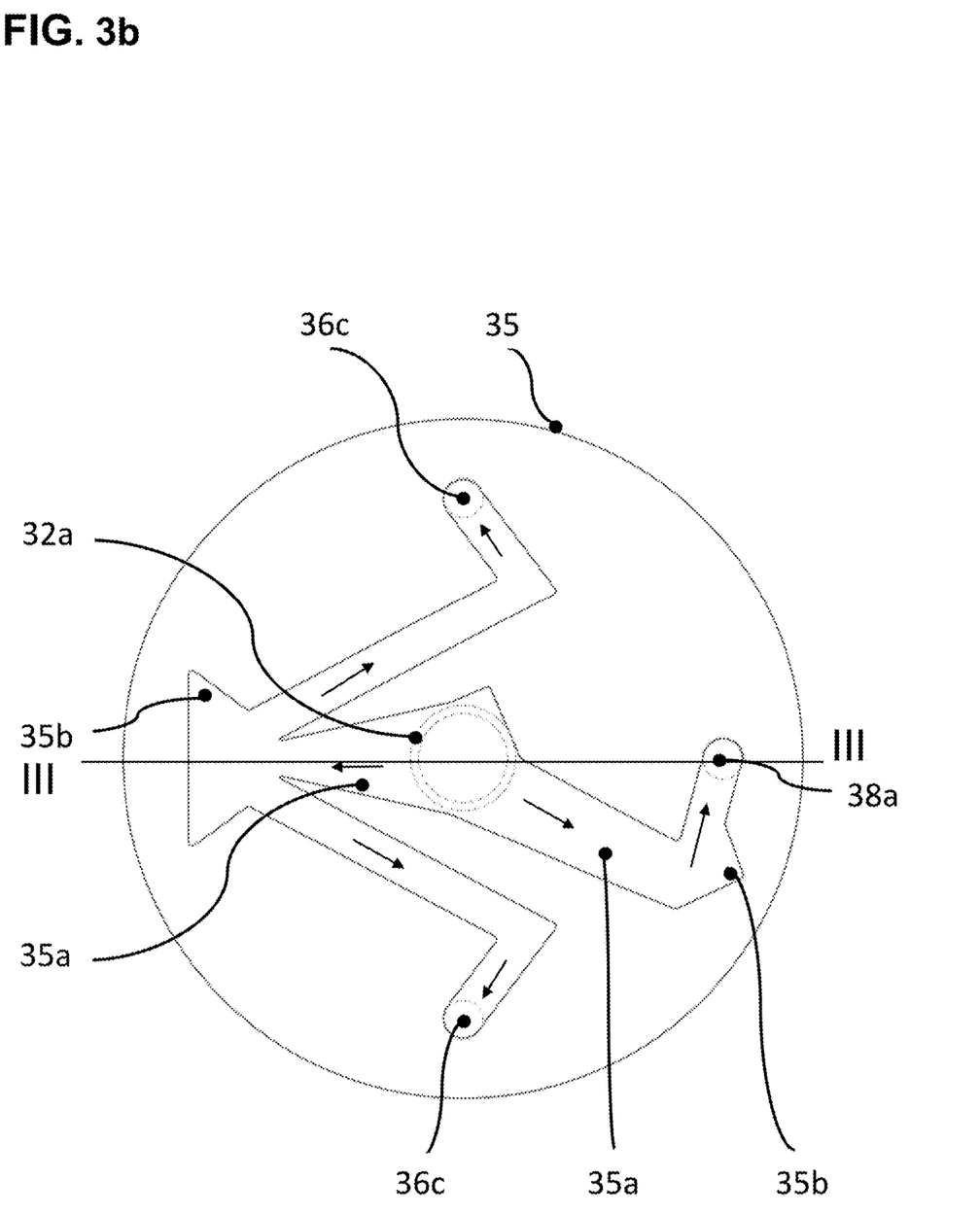
FIG. 3b is a top view of an alternative sensor protection element.

In this arrangement, a special sensor protection element 35 is used (see FIG. 3b).

The carrier plate 34 is sealingly connected to the sensor protection element 35 and has corresponding openings 36c for the connections of the capacitive sensor 36, as well as an opening 38a for the connection of the Pirani sensor 38b.

In addition, a cap 38 for the Pirani sensor is sealingly applied to the carrier plate 34, as is the heater 33. The heater 33 can be arranged on, under or within the carrier plate 34.

The measuring medium thus arrives from the connection 31b via the supply tube 32a through the sensor protection element 35, which is also heated (FIG. 3b) through the measuring openings 36c to the capacitive sensor 36 and through the measuring opening 38a to the Pirani sensor.

Electrical connections 39a of the two sensors, together with the power supply for heater 33 and the measurement connection for the temperature sensor, are connected to connector 39 via an insulating bushing.

FIG. 3b shows the top view of a sensor protection element 35, consisting of a plate in which narrowing flow channels 35a lead to particle reservoirs 35b. There, the fluid flows are deflected and passed on to the measuring openings 36c of the capacitive sensor 36 and to the measuring opening 38a of the Pirani sensor 38b. The cross-section indicated in FIG. 3b is shown in FIG. 3a.

Figure 4:
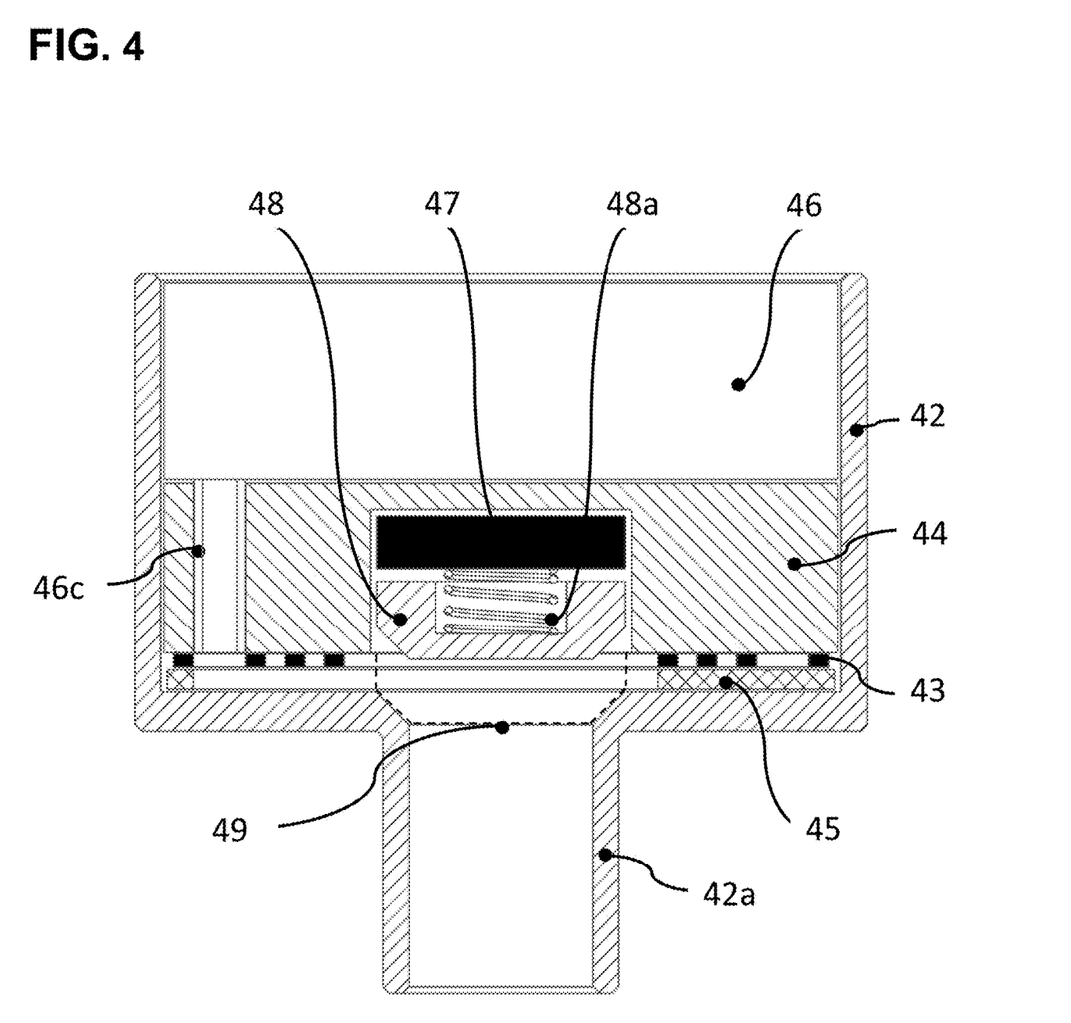
FIG. 4 is a cross-sectional view of a housing assembly with a locking device.

FIG. 4 shows an inner housing (sensor box), suitable for an arrangement as shown in FIG. 1a, but with an additional locking device to temporarily separate sensitive sensors from particularly aggressive media.

The inner housing 42 has a support and supply tube 42a. The carrier plate 44 with the heater 43 is located above the sensor protection element 45. The sensor 46 is connected to the flow channels of the sensor protection element 45 via the measuring openings 46c.

A movable closure element 48 is attracted by an electromagnet 47 and held in a position that allows the measuring medium to flow in from the supply tube 42a to the measuring openings 46c.

If the electromagnet is disconnected from the electric circuit, the spring 48a presses the movable closure element 48 into the position 49 and thus prevents the supply of aggressive medium to the sensor 46. The closure element 48 and the electromagnet 47 form an electromagnetic valve.

Figure 5A:
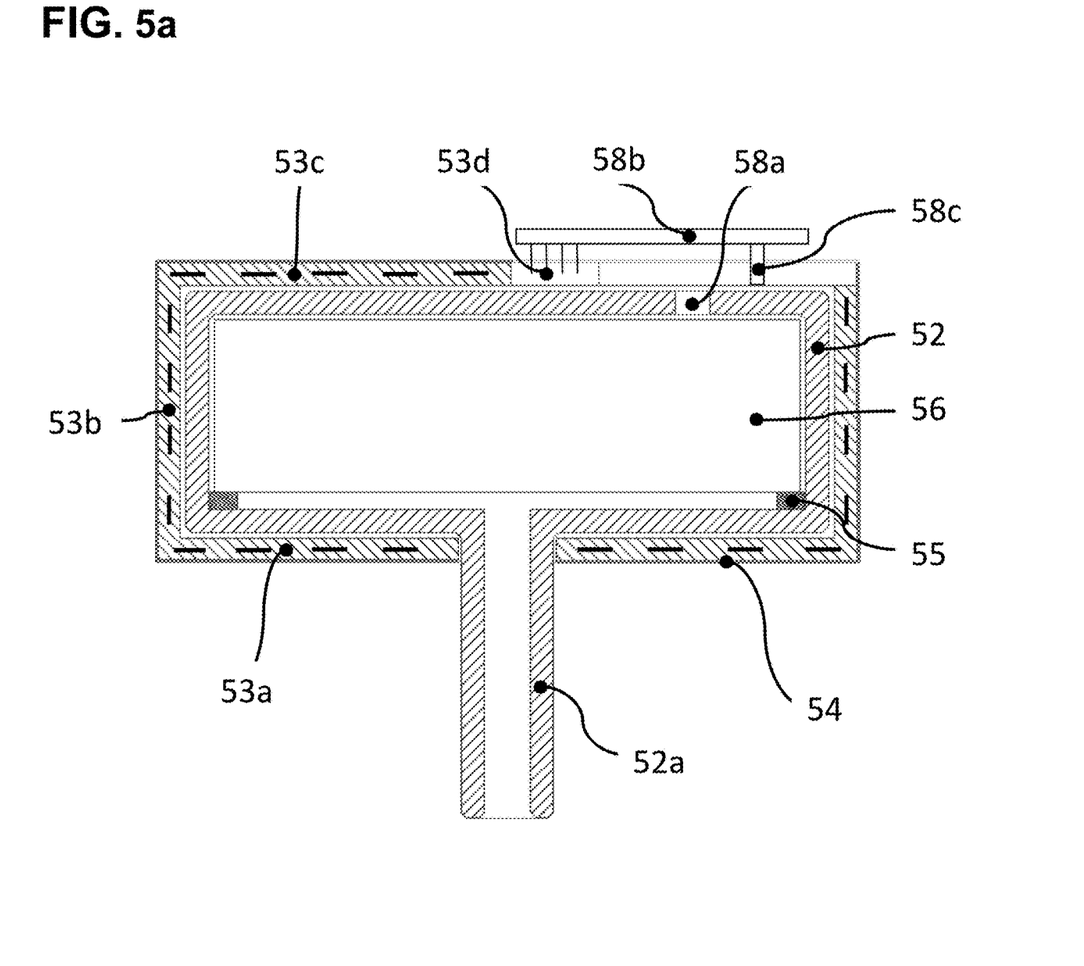
FIG. 5a is a cross-sectional view of a sensor box.

FIG. 5a shows the sensor box 52 of an arrangement with the support and supply tube 52a. If the sensor 56 is a particularly temperature-sensitive design, all-round heating is provided, which is attached to the outside of the sensor box 52 in a thermally conductive manner.

The sensor 56 is connected to the support and supply tube 52a by a sealing element 55, wherein the element 55 can simultaneously be one of the described sensor protection elements. The sensor 56 can be contacted through the opening 58a with a circuit board 58b which is fastened to the sensor socket 52 with supports 58c.

The all-round heating consists of a lower circular plate 53a, two jacket halves 53b and two upper semicircular plates 53c with header pins 53d. (see FIG. 5b). Optionally, a highly reflective metallization 54 is applied over the entire outer surface in order to minimize the radiation losses in the vacuum insulation.

Figures 5B, 5C:
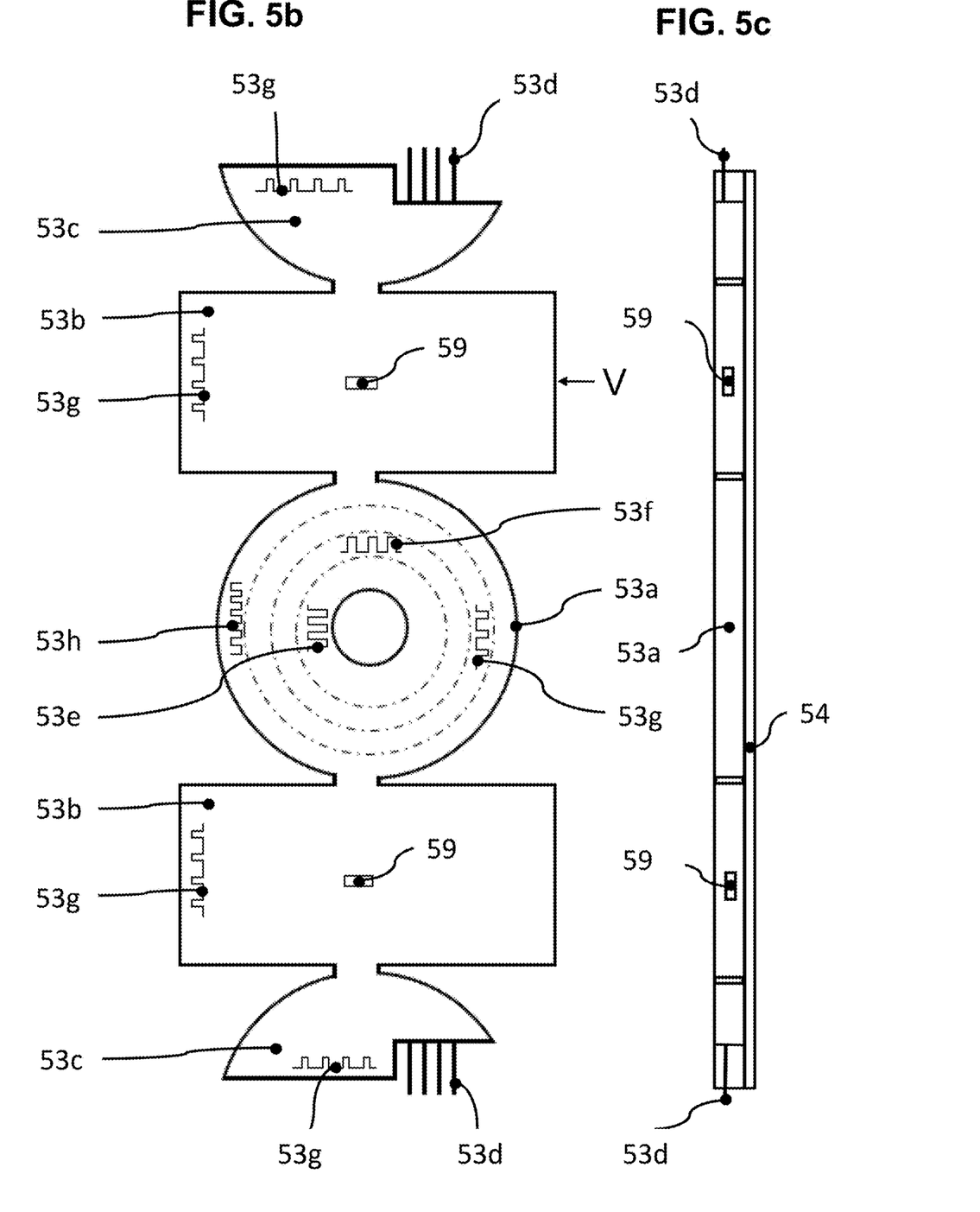
FIG. 5b is a laid-out view of a heating foil.
FIG. 5c is a side view of a heater.

FIG. 5b shows the top view of the all-round heating, preferably in the form of a heating film, consisting of a lower circular field 53a, two jacket fields 53b and two upper semicircular fields 53c. A temperature sensor 59 is integrated in each of the two jacket halves 53b.

The jacket fields 53b and the upper semicircular fields 53c have the task of compensating for radiation losses of the arrangement and therefore only require a low heating power per field area unit, represented by further extended heating meanders 53g.

In the lower circular field 53a, on the other hand, in the vicinity of the central opening (passage for the support and supply tube 52a), the higher direct heat dissipation via the support and supply tube 52a has to be compensated if a temperature distribution as even as possible is required on the lower carrier plate of the sensor box 52.

This can be done by providing a high heating power per field area unit, represented by tight heating meanders, in the inner zone 53e.

In the next zone 53f, an average heating power per field area unit, represented by average heating meanders, is provided.

In the next zone 53g, the low heating power to compensate for the radiation losses is arranged, as in the jacket fields and upper semicircular fields.

A zone 53h with a very high heating output per unit area is optionally arranged on an outer perimeter of the circular field 53a in order to be switched on briefly during the heating process of the arrangement and thus to shorten the time to operating temperature.

The electrical connections of the individual heating circuits and the supply lines to the integrated temperature sensors 59 are brought out via header pins 53*d*.

FIG. 5*c* shows a side view V of the open all-round film heater 53*a* with header pin 53*d* and the optional reflective outer coating 54.

Fluid sensors with high accuracy and stability requirements can be temperature controlled on the basis of the invention with little effort and within small space.

With sensor combinations (such as Pirani/capacitive, for example for the application "comparative pressure measurement"), the common stable temperature platform enables higher resolution and improved long-term stability.

In systems in which sensitive sensors are only required from time to time, the integrated valve in the arrangement can be used to achieve a considerably longer service life.

In order to ensure measurements with particularly high long-term stability and the greatest possible independence from fluctuations in ambient temperature, the version with all-round heating within the vacuum insulation can be selected to provide the lowest operating power and a short warm-up time.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A housing assembly configured for receiving a sensor (16) configured for measuring parameters of a fluid, comprising:
    an outer housing (11) having a connection (11*b*) configured for connecting the outer housing to a container containing the fluid;
    an inner housing (12) which is arranged in the outer housing (11) and configured to receive the sensor (16);
    a tube (12*a*) having a first end connected to the outer housing (11) at the connection (11*b*) and a second end connected to the inner housing, the tube (12*a*) being adapted to direct the fluid into the inner housing (12); and
    a heating device arranged in or on the inner housing (12), the heating device being suitable for heating the inner housing (12) to a predetermined temperature and maintaining the predetermined temperature,
    wherein the inner housing (12) and the outer housing (11) are spaced apart from each other and connected only by the tube (12*a*), and
    wherein a space between the inner housing (12) and the outer housing (11) is evacuated.

2. The housing assembly according to claim 1,
    wherein the heating device includes
        a heater (13) and
        a temperature sensor (13*a*) which is suitable for regulating a temperature of the inner housing (12) to the predetermined temperature.

3. The housing assembly according to claim 2,
    wherein the heater (13) is arranged on one or more outer surfaces of the inner housing (12) and is connected to the inner housing (12) in a thermally conductive manner.

4. The housing assembly according to claim 3,
    wherein the heater (13) has a heating power which increases with increasing proximity to the tube (12*a*).

5. The housing assembly according to claim 2,
    wherein the heater (13) comprises of a heating foil.

6. The housing assembly according to claim 1,
    wherein a temperature difference between the predetermined temperature of the inner housing (12) and a temperature at the connection (11*b*) can be maintained due to a length of the tube (12*a*).

7. The housing assembly according to claim 1, further comprising
    a sensor protection element (15) which is arranged between the tube (12*a*) and the sensor (16) in the inner housing (12) in such a way that the fluid flowing through the tube (12*a*) to the sensor (16) must pass through the sensor protection element (15),
    wherein the heating device is suitable for heating the sensor protection element (15) to the predetermined temperature and keeping it at the predetermined temperature.

8. The housing assembly according to claim 7,
    wherein the sensor protection element (15) includes flow channels (15*a*) through which the fluid must flow from the tube (12*a*) to the sensor (16), and
    wherein the flow channels (15*a*) narrow with increasing distance from the tube (12*a*) in order to achieve an increased flow velocity of the fluid, and
    wherein the flow channels (15*a*) are connected to reservoirs (15*b*) in which particles entrained in the fluid collect due to the increased flow velocity without reaching the sensor (16).

9. The housing assembly according to claim 8,
    wherein a direction of flow of the fluid flowing to the sensor (16) is deflected in the reservoirs (15*b*).

10. The housing assembly according to claim 7,
    wherein the sensor protection element (15) comprises several plates lying one on top of the other with openings communicating with one another.

11. The housing assembly according to claim 1, further comprising
    a closure element (48) which is configured for selectively preventing the fluid from flowing out of the tube (12*a*) into the inner housing (12) by closing the tube (12*a*).

* * * * *